C. J. FOSTER & W. M. KEAR.
ATTACHMENT FOR CORN PLANTERS.
APPLICATION FILED JULY 3, 1908.
903,075.
Patented Nov. 3, 1908.
2 SHEETS—SHEET 2.
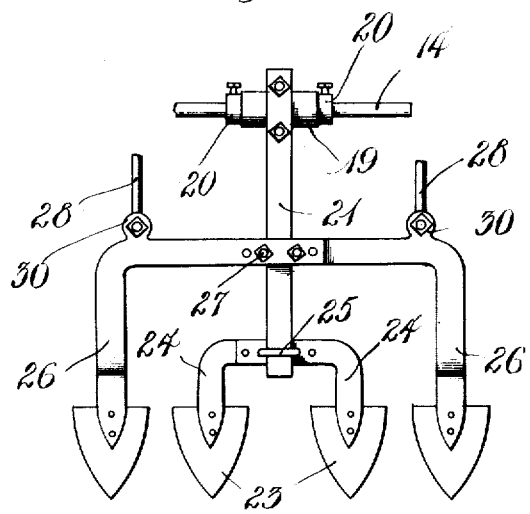
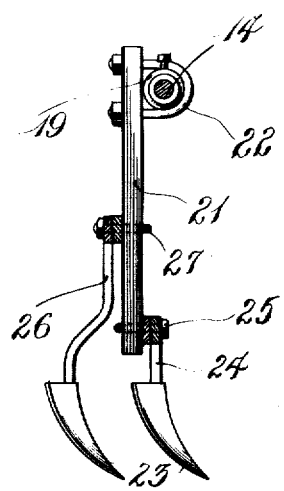
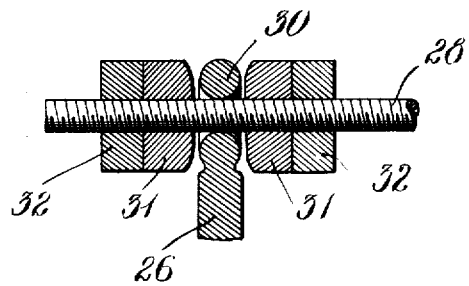
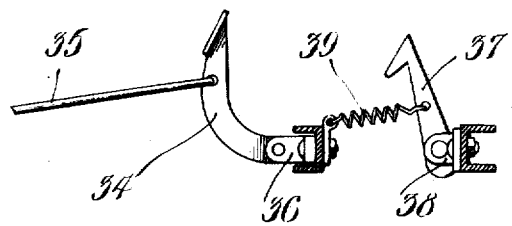

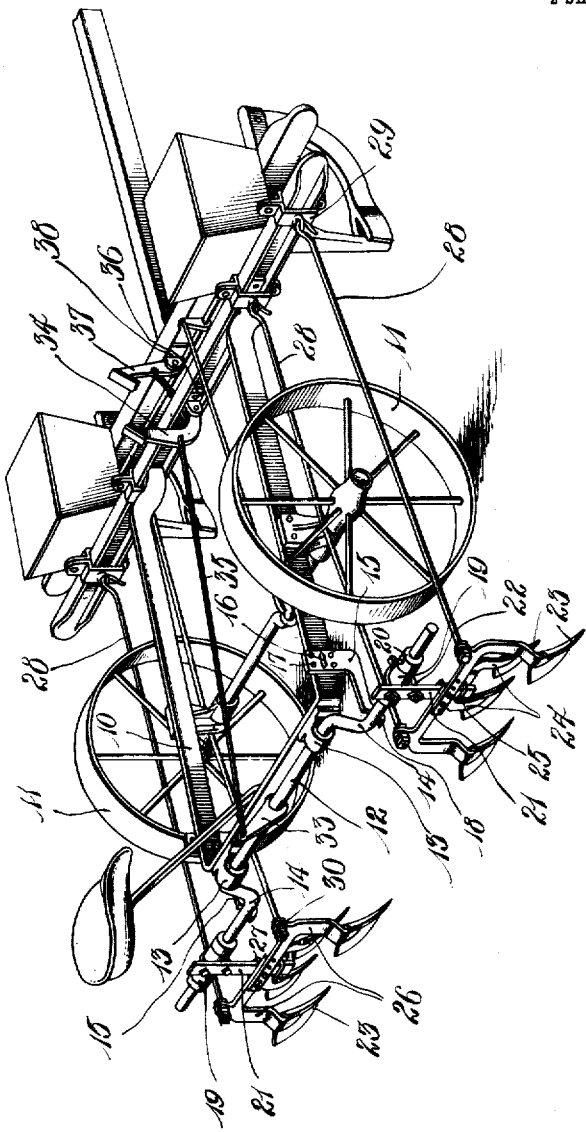

UNITED STATES PATENT OFFICE.

CHARLES J. FOSTER AND WILEY M. KEAR, OF VAN WERT, OHIO.

ATTACHMENT FOR CORN-PLANTERS.

No. 903,075.      Specification of Letters Patent.      Patented Nov. 3, 1908.

Application filed July 3, 1908. Serial No. 441,812.

*To all whom it may concern:*

Be it known that we, CHARLES J. FOSTER and WILEY M. KEAR, citizens of the United States, residing at Van Wert, in the county of Van Wert and State of Ohio, have invented certain new and useful Improvements in Attachments for Corn-Planters, of which the following is a specification.

This invention relates to agricultural implements, and has particular reference to attachments for corn planters whereby the kernels of corn will not only be certain to be covered, but the soil will be left in the condition most advantageous for the germination and growth of the corn. The improvement is designed to be attached to any ordinary type of corn planter, whether of the check row make or otherwise. It is to be understood also that the attachment shall be applicable to planters not only of various makes but of varying widths.

More specifically stated the invention includes covering mechanism carried by the rear portion of the planter frame and adapted to follow comparatively closely in the rear of the carrying wheels. It also includes foot operated mechanism whereby the covering devices *per se* may be elevated for the purpose of turning or transportation of the machine. The foregoing and other objects of the invention will be better understood as the following detail description progresses, when taken in connection with the accompanying drawings, in which—

Figure 1 is a general perspective view of the invention applied to a conventional type of corn planter; Fig. 2 is a rear elevation of one of the covering mechanisms; Fig. 3 is a vertical section of the device indicated in Fig. 2; Fig. 4 is a detail in section of a connection between one of the stay rods and the covering mechanism; Fig. 5 is a detail of the lock mechanism for the foot device, and Fig. 6 is a detail showing the connection for the front end of one of the stay rods.

Throughout the following detail description and on the several figures of the drawings, similar parts are referred to by like reference characters.

At 10 is indicated a conventional form of planter frame, supported by the two main planter wheels 11. The wheels 11 as ordinarily constructed are intended to assist the planting mechanism in the covering of the kernels of corn. It frequently occurs, however, that the soil is in such condition that there is insufficient loose dirt to enable the wheels to properly cover the kernels. Again, under certain conditions the main wheels of the planter cause the soil to be packed down so firmly that baking of the ground results, making it exceedingly difficult for the seed to sprout and grow. Also it is not infrequent that the paths made by the shoes of the planter become fruitful sources for washing of the soil, the water following along such paths. By the use of our improvement all of the foregoing objectionable features are obviated as will hereinafter appear.

At the rear end of the frame 10 and extending transversely thereof is a rock shaft 12, the outer ends of which are offset and extend outwardly parallel with the main portion of the said shaft. The shaft is journaled in bearings 13 secured to the said frame. The outer ends of the shaft or bell cranks 14 extend downwardly and rearwardly from the main portion of the shaft and are each adapted to be supported in one position by a bracket 15 secured to the frame by means of a U-shaped bolt 16 engaging in a pair of a series of holes 17 in the bracket. By this means of connection between the bracket and the frame it may be readily adjusted vertically, whereby the depth to which the bell crank may turn will be determined. At the rear end of the bracket is a hook or open jaw 18 which receives the bell crank. The brackets 15 being substantially alike, a specific description of one will be understood as applicable to both.

Mounted adjustably on each of the bell cranks 14 is a journal box 19, the same being held according to longitudinal adjustment by means of locking collars 20. The upright 21 is secured to each of said boxes 19, as by means of a U-bolt 22, said bolt embracing the box and passing preferably through the holes in the upright 21 where it is secured permanently by locking nuts.

The mechanism which has immediate contact with the soil includes a plurality of shovels 23, preferably four in number in the rear of each wheel. Said shovels may be supported upon the upright 21 in any convenient manner so as to carry out the objects of this invention. We deem it best however to arrange the shovels so that there shall be two pairs in the rear of each carrying wheel, one pair being in front of the other pair, and the shovels of each pair being adjustable toward and from each other, so as to vary the width of the soil operated upon by them. The supporting means for the shovels as herein disclosed consists of pairs of posts or standards, one pair for each pair of shovels. The front pair of posts or standards 24 are clamped on the front face of the upright 21 and the posts or standards for the rear shovels are clamped upon the rear face of the upright. Each of the said posts or standards comprises a vertical portion and a substantially horizontal portion, the horizontal portions of the posts or standards of the same pair overlapping each other and being provided with a series of holes through which the clamping U-bolt passes as it embraces the upright. The posts or standards 24 are clamped to the upright by means of a clamp 25 and the rear posts or standards 26 are clamped to the upright by means of a clamp 27. By the means above set forth and illustrated the shovels of each pair may be supported or brought toward each other by varying the particular holes through which the clamping member passes. Furthermore the pair of posts or standards may be adjusted vertically upon the upright if desired by the same means.

So far as described the box 19 and the shovel mechanism secured thereto are free to rotate upon the bell crank 14. In order, however, to hold such covering mechanism in proper operative relation to the wheel which it follows there are provided stay rods 28, preferably two for each set of shovels, and said stay rods are connected pivotally at their front ends to clamps 29 secured to any convenient part of the frame of the machine. The rear ends of the stay rods pass through eyes 30 connected preferably with the posts or standards 26, and by means of adjustment nuts 31 and lock nuts 32 the position of the covering mechanism with respect to the wheel is determined and maintained.

Extending at an angle from the rock shaft 12 at any convenient point intermediate of its ends is a projection 33 to the outer end of which a foot lever 34 is connected by means of a connecting rod 35. The foot lever is pivoted to a bracket 36 secured in front of the driver to any convenient stationary portion of the frame. At another portion of the frame, preferably in front of the clamp 36, is a pivoted dog 37 connected to a bracket 38. As indicated the dog is pivoted in such a manner to the bracket 38 that its lower end will cooperate with the bracket so as to limit the movement of the dog rearwardly. A tensile spring 39 is connected to the dog above its pivotal point and secured at its other end to the bracket 36, the normal tendency of which is to draw the dog rearwardly into the path of the foot lever 34. Upon operation of the foot lever forwardly the bell cranks will be swung upwardly lifting the shovels from the ground, and if such movement of the foot lever is sufficiently great it will be brought into engagement with the dog 37 where it will be held until subsequently released by the foot of the operator when desired.

The several elements of our construction may be made of any suitable materials, and furthermore it will be understood that the relative proportions and sizes of the many details of construction may be varied to a great extent within the scope of the invention hereinafter claimed.

Having thus set forth a practical embodiment of our invention, what we claim as new and desire to secure by Letters Patent of the United States, is:

1. The combination with a corn planter embodying a frame and main supporting wheels, of covering mechanism comprising a rock shaft journaled upon the rear of the frame, said shaft having bell cranks at its ends, shovel mechanism journaled upon each of said bell cranks, means secured to the frame to limit downward movement of the bell cranks and having loose connection therewith, means extended from the shovel mechanism to the frame to hold the said mechanism in proper position with relation to the wheels, and means to rotate the rock shaft.

2. In combination, a planter frame, main supporting wheels therefor, a rock shaft journaled upon the frame and having end bell cranks, brackets adjustably secured upon the frame and having rearwardly extending open jaws to receive the bell cranks, a pair of uprights journaled upon the ends of said bell cranks, pairs of shovel posts and shovels adjustably secured to said uprights, and stay rods connected to the frame and to certain of said shovel posts.

3. The hereindescribed covering mechanism for corn planters comprising a movable support, a journal box adjustably mounted upon each end of said support, a substantially vertical upright secured to said box, pairs of angular shaped posts having horizontal series of holes for lateral adjustment, means to clamp said pairs of posts to the upright, shovels carried by said posts, and means to limit the rotation of the said box upon said support.

4. The combination with a corn planter including a frame and main wheels, of an attachment therefor comprising a rock shaft journaled upon the frame, said rock shaft having bell cranks extending oppositely from its ends, rearwardly extending brackets secured adjustably to the frame and having open jaws to receive said bell cranks limiting their movement in one direction, covering mechanism including shovels journaled upon the outer ends of said bell cranks, a lever extending at an angle from said rock shaft, a foot lever connected to said lever, and spring operated means to engage and hold the foot lever in one position of its adjustment, substantially as set forth.

In testimony whereof we affix our signatures in presence of two witnesses.

CHARLES J. FOSTER.
WILEY M. KEAR.

Witnesses:
 LUELLA E. BLAKE,
 MALINDA KEAR.